E. E. Stow.
Imp'd Handle for Tea & Coffee Pots.
No. 71920. Patented Dec. 10, 1867.
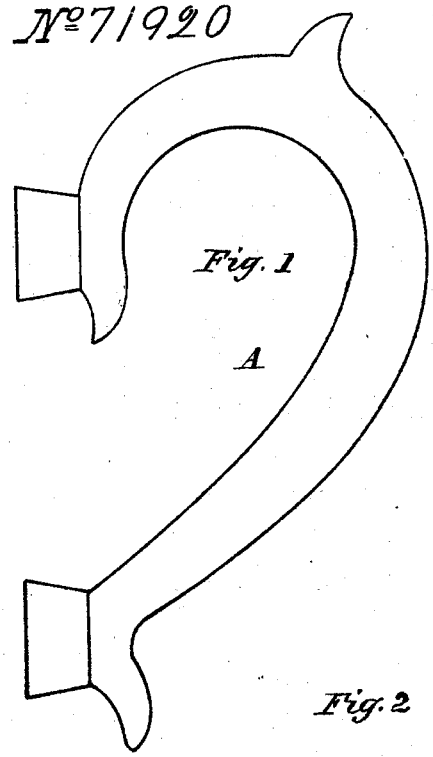
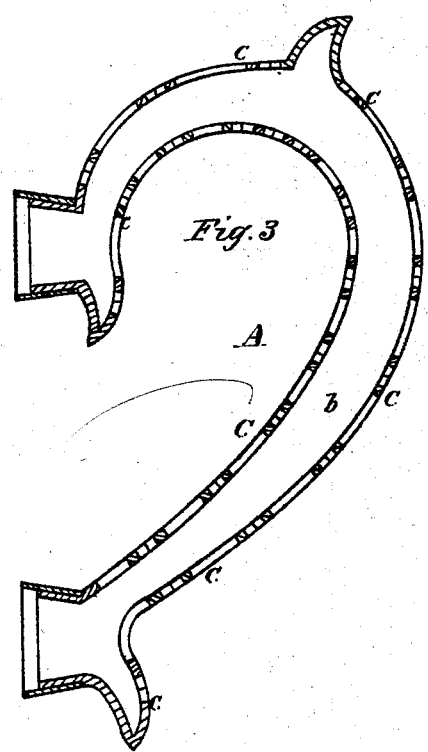
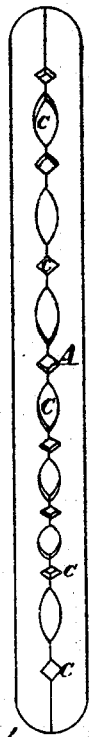
Witnesses
Geo. H. Andrews
Lauritz Miller
Inventor
Enos E. Stow.
by his attorney
R. H. Eddy

United States Patent Office.

ENOS E. STOW, OF PLANTSVILLE, CONNECTICUT.

*Letters Patent No. 71,920, dated December 10, 1867.*

IMPROVEMENT IN HANDLES FOR TEA AND COFFEE-POTS.

*The Schedule referred to in these Letters Patent and making part of the same.*

TO ALL PERSONS TO WHOM THESE PRESENTS SHALL COME:

Be it known that I, ENOS E. STOW, of Plantsville, in the county of Hartford, and State of Connecticut, have invented a new and useful Improvement in Handles for Tea or Coffee-Pots, or other vessels for containing a liquid in a hot state; and I do hereby declare the same to be fully described in the following specification, and represented in the accompanying drawings, of which—

Figure 1 is a side elevation,

Figure 2 an edge view, and

Figure 3 a longitudinal section of a tea-pot handle, as provided with my invention, the nature of which is to be found in making the handle tubular or hollow, and with apertures in it for air to enter its bore, and pass out therefrom, such air, while in circulation through the bore, serving to abstract heat from the handle when it may be in a heated state.

The object of my invention or improvement is to preserve the handle in a cool state, or one in which it can be grasped by the hand of a person with impunity, while the tea-pot or vessel to which it may be applied may be in use or contain hot water.

In the drawings, A denotes such a handle, and $b$ its bore, the handle being made hollow from end to end. One or more ranges or series of openings or holes, $c\ c\ c$, are made through the rear and front sides of the handle, so that after it may be fixed to the pot or vessel air may pass through some of such openings into the interior or bore of the handle, and out at others, the air so passing into the handle being made to abstract heat from it, and conduct such heat away from it.

What I claim as my invention, is—

A handle, as made hollow or tubular, and provided with openings in or through it, that when applied to a pot or vessel warm or heated air may be caused to pass into and through and out of such handle, substantially as and for the purpose specified.

ENOS E. STOW.

Witnesses:
STEPHEN WALKLEY,
O. W. STOW.